United States Patent
Sakai

[11] Patent Number: 6,127,458
[45] Date of Patent: *Oct. 3, 2000

[54] ARTIFICIAL STONE COMPOSITION AND METHOD OF MANUFACTURING ARTIFICIAL STONE

[75] Inventor: Tsuyoshi Sakai, Tokyo, Japan

[73] Assignee: Doppel Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,105

[22] PCT Filed: Oct. 31, 1994

[86] PCT No.: PCT/JP94/01832

§ 371 Date: Jul. 9, 1997

§ 102(e) Date: Jul. 9, 1997

[87] PCT Pub. No.: WO96/13469

PCT Pub. Date: May 9, 1996

[51] Int. Cl.⁷ ...................................................... C08K 7/00
[52] U.S. Cl. ........................... 523/220; 523/212; 523/213
[58] Field of Search ..................................... 523/212, 213, 523/220

[56] References Cited

U.S. PATENT DOCUMENTS

| | | | |
|---|---|---|---|
| 3,663,493 | 5/1972 | Miller | 523/220 |
| 3,940,358 | 2/1976 | Bernett | 523/220 |
| 4,059,551 | 11/1977 | Weiant | 523/220 |
| 4,472,540 | 9/1984 | Barker | 523/220 |
| 4,616,050 | 10/1986 | Simmons | 523/220 |
| 4,740,538 | 4/1988 | Sekutowski | 523/213 |
| 4,863,978 | 9/1989 | Plueddemann | 523/213 |
| 5,358,993 | 10/1994 | Timm et al. | 524/445 |
| 5,422,391 | 6/1995 | Inoue | 524/427 |
| 5,426,145 | 6/1995 | Ponce | 523/220 |
| 5,494,949 | 2/1996 | Kinkel | 523/213 |
| 5,571,851 | 11/1996 | Freeman | 523/213 |

FOREIGN PATENT DOCUMENTS

| | | |
|---|---|---|
| 56-40117 | 9/1981 | Japan . |
| 62-275048 | 11/1987 | Japan . |
| 2-140940 | 11/1990 | Japan . |
| 5-24895 | 2/1993 | Japan . |
| 5-36388 | 5/1993 | Japan . |
| 6-92706 | 4/1994 | Japan . |
| 6-157102 | 6/1994 | Japan . |

*Primary Examiner*—Paul R. Michl
*Attorney, Agent, or Firm*—Wenderoth, Lind & Ponack, LLP

[57] ABSTRACT

The invention provides an artificial stone of the following composition, having a deep color tone and gloss, and a highly dense and uniform structure.

An inorganic fine particle component having a size of 10 to 70 mesh is used, and the sum of the inorganic fine particle component and an inorganic microparticle component having a size of 100 mesh under accounts for at least 85 wt. % of the entire product, and a resin component accounts for under 15 wt. %. All or part of the fine particle component is surface-coating-hardened in advance by an inorganic or organic substance. The artificial stone of the invention has a uniform composition of the individual components, and fine particles are exposed on the surface by polishing.

20 Claims, No Drawings

6,127,458

ARTIFICIAL STONE COMPOSITION AND METHOD OF MANUFACTURING ARTIFICIAL STONE

BACKGROUND OF THE INVENTION

1. Field of the Invention

The present invention relates to an artificial stone composition and a method of manufacturing an artificial stone. More particularly, the present invention relates to a method of manufacturing an artificial stone, light in weight and higher in hardness, strength and density, which has an excellent surface condition like granite or marble and has excellent properties such as surface hardness and surface wear resistance, and provides an artificial stone useful as a material for a wall, a floor and other building materials, civil engineering materials and a stone column.

2. Description of the Related Art

There is known a conventional practice of manufacturing an artificial stone to crush a material stone into appropriate pieces, mix calcium carbonate and a resin, and then hardening the same. More specifically, Japanese Provisional Patent Publication No. S61-101,443 discloses a method of obtaining a lumpy artificial stone capable of withstanding cutting, which comprises the steps of mixing material stone powder and resins in vacuum, injecting the mixture into a mold, taking out the molded mixture and subjecting the same to cutting.

Another Japanese Patent Publication No. S53-24,447 discloses, for the manufacture of an artificial stone by the use of powder particles of a natural stone and a synthetic resin, the use of the raw materials at a prescribed mixing ratio, and the necessity of applying a sufficient pressure after placing the raw materials in a mold.

However, artificial stones obtained by these conventional methods pose a problem that, in spite of the use of powder particles of natural stones, the color tone or the feeling of depth is not always satisfactory.

Conventional artificial stones are defective in that the color tone of the surface inevitably becomes darkish and dull. It is therefore conventionally an actual state that it is very difficult to achieve a granite-like or marble-like surface provided with a feeling of transparency, deepness and massiveness.

A conceivable reason is that surface light reflection and absorption largely differ between artificial stones, depending upon the chemical composition, the particle size and blending ratio of natural stone powder particles, and almost no study has conventionally been made on such point of view.

Further, the chemical composition of an artificial stone largely affects moldability, and depending upon the size or blending ratio of natural stone powder particles blended in an artificial stone, or the ratio of a binder resin, a problem may be encountered in that fluidity for molding is lost, or bubbles remain in the molded body, thus seriously impairing quality and strength of the product artificial stone.

To overcome these problems, Japanese Patent Publication No. S53-24,447 proposes fluidization through increase in the amount of resins, which permits prevention of generation of bubbles.

However, on the other hand, while increasing the resin content is useful for ensuring a satisfactory fluidity and preventing production of bubbles, this exerts an adverse effect on properties of a resulting artificial stone.

More specifically, use of a large quantity of resins leads to resinification of an artificial stone product, and the resultant product means only the presence of natural stone powder particles in resins, and physical properties thereof are closer to those of the raw material resins than to those of the raw material stone. In spite of the name of an artificial stone, it is only a resin product having an appearance of a stone.

Under these circumstances, there has been a demand for development of a novel artificial stone which solves the defects of the conventional artificial stones, and when using powder particles of natural stones and the like as raw materials, has a dense structure, gives a feeling of deepness, together with a transparent color tone, has features of a natural stone such as granite or marble, and is excellent in moldability, permitting achievement of any arbitrary shape such as a plate or a rod.

SUMMARY OF THE INVENTION

The present invention was developed in view of the circumstances as described above, and provides an artificial stone composition comprising a mixed inorganic component which comprises an inorganic fine particle component and an inorganic microparticle component, in which the sum of the inorganic fine particle component having a size of from 10 to 70 mesh and the inorganic microparticle component having a size of 100 mesh under accounts for at least 85 wt. % of the entire product, and resin components accounting for under 15 wt. % of the entire product, wherein all or part of the inorganic fine particle component comprises transparent fine particle component in which individual particles or particle lumps are previously coated with an inorganic or an organic substance.

The present invention provides also an artificial stone molded product molded by injecting or charging the above-mentioned composition into a mold.

The present invention provides furthermore an artificial stone molded product wherein the surface of the molded artificial stone is polished.

DESCRIPTION OF THE PREFERRED EMBODIMENTS

Now, the present invention will be described below further in detail.

The raw materials composing the artificial stone of the present invention are broadly divided into the following three components. One is an inorganic fine particle component having a size of from 10 to 70 mesh as the main component. Appropriate inorganic fine particles from silica, olivine, feldspar, pyroxene, mica and other minerals, natural stones such as granite and metamorphic rock, ceramics, glass and metals are applicable.

Together with this fine particle component, a microparticle component having a size of 100 mesh under is used. This microparticle component comprises, for example, various natural or artificial microparticle components. Readily available microparticle components include, for example, calcium carbonate, water and aluminum oxide.

As part of this microparticle component, there may be added and blended such components as manganese dioxide, titanium dioxide, zirconium silicate and iron oxide, and antimony trioxide, boron compounds and bromine compounds for imparting hard flammability.

The third component is the resin component. A resin component can be selected widely from thermoplastic ones.

As the resin component, applicable examples include aryl resin, methacryl resin, and unsaturated polyester resin.

The fine particle component of a natural stone exerts an effect as a main factor on the appearance and physical properties of the resultant artificial stone. Particularly, partial exposure thereof, together with the other components, serves as main factor for exterior color and pattern.

As compared with the fine particle component, the microparticle component is far smaller in size than the 100 mesh level, and is present so as to penetrate into spaces between individual fine particles and fill up these spaces. This component contributes to availability of such properties as hardness and flexibility of the resultant artificial stone. The weight ratio of the fine particle to microparticle components should preferably be within a range of from 0.5:1 to 5:1.

In contrast to the fine particle component and the microparticle component of the natural stone forming the above-mentioned frame, the resin component has a function of contributing to covering these other components and connecting all the components, and upon completion of an artificial stone, imparting necessary elasticity or tensile strength to the product.

The ratio of these components is important in the present invention. Particularly important is the ratio of the resin component to the others. In the present invention, permitting achievement of a highly dense product having a dense structure is one of the features. This high density means that the fine particle component and the microparticle component contained in an artificial stone product are present at a high density, and the extent thereof of over 2.2 g/cm$^3$, for example, is over the range of content in a conventional artificial stone.

More specifically, a higher ratio of fine particles of natural stone forming the frame leads to a product closer to a natural one. A very high ratio makes it difficult for the product to harden and therefore to be used as such. The resultant product has poor physical properties, so that is cannot be used in usual applications.

Even use of a higher ratio of microparticle component causes inconveniences such as impossibility to harden, makes a product poor in gloss, and results in a product which cannot be called a stone.

Therefore, the ratio of the fine particle component and the microparticle component is limited: the ratio must be over 85 wt. %, or more preferably, over 90%. With a ratio of over 95%, the product becomes brittle and hardly practicable. With a ratio of under 85%, the product is too soft, thus making it impossible to obtain properties as a stone, with a scope of application similar to that of a resin plate.

This means that the resin component other than the fine particle component or the microparticle component of natural stones should not be present in an amount of over 15 wt. % on the maximum.

A content of the resin component of over about 15% makes the product more like plastics, retaining only the name of artificial stone. An excessively small content of the resin component, although improving the exterior view closer to the natural color of the product, makes the product more brittle and not suitable for practical use. From such a point of view, the content of the resin component should more preferably be within a range of from 3 to 10 wt. %.

In the artificial stone composition and the artificial stone as a product of the present invention, a required prerequisite is that all or part of the foregoing inorganic fine particle component should take the form of transparent particles, and further, these particles or lumps thereof should previously be coated with an inorganic or organic substance, and this forms an essential feature of the present invention.

Such a coating of the transparent fine particle component is accomplished by conducting coating and setting of the resin on the surface of the transparent fine particle component, or baking an inorganic substance such as water glass or a glaze for ceramics. In any event, the surface of the transparent fine particle component should have a coating having a thickness of from several $\mu$m to several tens of $\mu$m, for example, from 5 to 50 $\mu$m, or more preferably, from about 20 to 30 $\mu$m. More specifically, for example, a coating may be accomplished by using an acryl resin or an unsaturated polyester resin composition, and heating, or irradiating a light to, the resin composition to a temperature of about 150 to 300° C., thereby coating the surface of particles of the fine particle component and hardening the same, or by using water glass or a glaze, and baking the same to a high temperature of about 800 to 1,100° C., thereby achieving an inorganic coating.

Such a coating largely improves affinity of the fine particles serving as aggregates for the artificial stone to the entire structure. Mixture of the microparticle component and the resin component imparts a high strength and leads to a satisfactory surface hardness.

More important is the fact that, since transparent natural stones or the like are used for the fine particle component and the surface thereof is covered with a hard coating as described above, polishing the surface of the artificial stone product partially breaks this coating layer. As a result, the surface structure comprising partially exposed inorganic transparent fine particles and the surrounding coating layer gives a unique reflection effect of light.

That is, the light enters the transparent fine particles, is reflected on the surrounding coating layer, and passes again through the transparent fine particles. Such light penetration and reflection phenomenon is essentially different from reflection from only the surface in a conventional artificial stone, thus imparting a unique feeling of deepness to the artificial stone product of the present invention. Thus, there is available a high-quality marble-like artificial stone giving massiveness and deepness.

The ratio of this transparent fine particle component having the coating layer as described above may be generally within a range of from 10 to 100% relative to the total amount of the inorganic fine particle component blended in the composition of the present invention.

In the present invention, the size of the inorganic fine particles should be a prescribed one. More specifically, the inorganic fine particle component should have a size within a range of from 10 to 70 mesh as described above. Except for special cases, a uniform size should preferably be kept. When using colored and colorless ones and the color is darker on the upper or lower side, it is conceivable to use different sizes of fine particles corresponding to colored and colorless ones. Use of large quantities of excessively different sizes should not be used because of the possibility of deterioration of strength of the product.

The microparticles should have, on the other hand, a size of 100 mesh under as described above so as to ensure sufficient penetration between fine particles. It should not therefore be close to that of the fine particles. More specifically, it should preferably be within a range of from 150 to 250 mesh.

It is also important that, in the high-density artificial stone of the present invention, except for special cases, these materials should uniformly be distributed in any part of the product.

It is further desirable to polish the outer surface of the product. That is, in at least a part of the surface, the coating layer should preferably be partially broken to expose part of the fine particles.

Polishing is a convenient way in practice to expose the dense structure possessed by the high-density artificial stone having deepness of the present invention on the surface. It is needless to mention that a part of the product surface may be polished to exposed the fine particle component, and the difference from the other part of the same surface may be used as a pattern.

When obtaining an artificial stone, the color tone and design of the target natural stone are important. Granite and marble are often used as targets because it is difficult to obtain a product from natural one and because of the beautiful gloss. In this case, gloss is an important factor determining the value of granite or marble. For natural granite or marble, colors are different and diverse from black to white or to red, and among the same color ones, the degrees are different.

When coloring various artificial stones, for example, in black, it suffices to use only black powder of natural stones. When using a neutral tint of color, however, there has conventionally been a problem of reproducibility. It has been difficult to give a unique gloss of marble even with a satisfactory color.

For example, even when using a dye or a pigment for coloring, it has conventionally been difficult to impart gloss or deepness.

In the present invention, on the other hand, a transparent fine particle component is used. When desiring to achieve the gloss of granite or marble, fine particles obtained by milling a natural quartz stone may be used as the fine particle component.

Fine particles obtained by milling a natural quartz stone have a unique flat and smooth portion in the surface because the raw material is quartz. Particles are often colorless and transparent. The color, if any, is not a strong one, and if not transparent, particles often retain transparency to some extent.

By using this raw material, it is possible to control the color of the product by means of the color tone of the coating layer and the resin component, and impart deepness and gloss to the color by the presence of a transparent quartz fine particle component.

When, for example, the coating layer is a water glass baked layer containing a white pigment, or when the stone has a hardened layer of an unsaturated polyester resin and an unsaturated polyester resin is used as the resin component, the resin has a slightly yellowish white in general, leading to a product of glossy milk white. There is therefore available a product having a color tone close to a natural marble of milk white.

By using a coating layer containing a coloring agent such as a pigment or a dye, and further, adding an inorganic pigment such as titanium dioxide, zirconium silicate, manganese dioxide, iron oxide or cobalt oxide, an organic pigment such as an azo-pigment or a phthalocyanine pigment, or any of various dyes to the resin component, there is available a product having a uniform color with a unique tone with deepness and gloss.

In the artificial stone composition of the present invention, a color particle component having substantially the same size as the fine particle component may be used in mixture to impart a color to the product.

At all events, it is possible to ensure a color reproducibility far easily then in the conventional artificial stones, without discoloration, and a product excellent in deepness and gloss is available.

In the artificial stone of the present invention, it is particularly effective to apply a glaze for coloring ceramics to powder particles of natural transparent fine particle component, baking the same into powder particles of a desired color, and use these particles as the fine particle component. By using this method, it is possible not only to ensure a desired color, but also to have a wide choice.

When milling natural quartz stone into the same size as the fine particle component, applying a glaze thereon, baking the same, there is no risk of trouble for such colors as black and red, and the reproduced color is provided also with gloss and tone reproduced perfectly, thus providing advantages unavailable in the conventional coloring method.

At all events, the fine particle component having a coating layer formed by baking is used at a ratio within a range of from 10 to 100% of the total fine particle component.

With a view to taking balance with the color tone, a short fiber component may be blended to reinforce the structure of the formed product. For example, applicable fibers include glass fiber, ceramics fiber, metal fiber and resin fiber. Glass fiber is particularly favorable for this purpose.

Short fibers having a diameter of from 10 to 100 $\mu$m, a length of from 1 to 10 mm are usually used in an amount within a range of from 1 to 10 wt. % relative to the fine particle component.

The high-density artificial stone of the present invention having excellent color properties may be of any shape such as plate, rod or cylinder.

A forming method can be selected from widely many ones including, for example, the mold injection and compression molding.

An important point in the manufacturing method of the present invention is that the used mold is not a closed one. The open portion should be clearly a part relative to the total surface area.

For example, for a square cylinder, a mold in which the portion forming the edges of a plate is opened should preferably be used with the opening side above the other sides.

An opening side may also be accomplished, in addition to that described above, by making the narrower side semi-open, i.e., for example, by forming this side in a mesh-shaped form so as to prevent easy outflow of the fine particles.

When injecting a uniformly mixed fluid of the resin component, fine particle component and microparticle component is injected into a mold formed as described above, it is effective to reduce the inner volume of the mold after injection with a view to reducing the resin content in the resultant artificial stone while ensuring a sufficient fluidity upon injection.

More specifically, for example, when the mold interior is flat, the flat walls are brought closer to reduce the thickness. As a result of this reduction of the inner volume, the resin component flowing out the mold gathers in the open portion, and further flows out through the open portion. Or, by reducing the inner volume by pushing up the bottom portion after injection, the resin component in the upper portion flow out.

Since the resin component has a larger specific gravity than the fine particle component or the microparticle component, it begins sinking down upon injection into the mold, and sinking rapidly proceeds because of a large difference in the specific gravity. By the reduction of the inner volume, only the light resin component is pushed out and gathers at the open portion. The resin component in a controlled amount can therefore be taken out by using a mold of a prescribed inner volume, and then reducing the inner volume by a prescribed amount. The amount of resin component upon solidification of the formed artificial stone is thus smaller than the amount of resin component upon injection, and the amount of resin component in the product can be reduced from that upon injection.

Compression molding is effective as well as a manufacturing method in the present invention.

Compression molding comprises the steps of injecting a material (mixed material) formed by blending and kneading the fine particle component, the microparticle component and the resin component in necessary amounts derived from the composition after the completion of molding into a lower half of a horizontal mold, placing the upper half of the mold, and pressing the same under a surface pressure within a range of from 5 to 100 kgf/cm$^2$. In this molding, the material is heated to a temperature of about 90 to 140° C. for a period of about 5 to 20 minutes during compression.

In compression molding while heating, vibration may be applied, together with a pressure, to the mold to improve fluidity of the mixed material in the mold.

Compression molding displays, as described above, its mass-production effect as a molding method of a relatively simple shape, and is excellent in economic merits as there is almost no loss of material.

In the present invention, the surface of the molded product may be processed after the completion of molding so as to exposed the fine particle component to the surface.

A first practice for this purpose is selective removal of the resin component. It is effective, after stripping off the mold, to eject a high-pressure water onto the molded product surface to apply a surface processing.

This processing is not limitative, varying with the thickness, distance from the nozzle, processing form and various other conditions. In a usual case with a thickness within a range of from 2 to 20 cm, water of a pressure within a range of from 50 to 800 kg/cm$^2$ may be ejected from a nozzle height of about 2 to 10 cm. This water pressure is lower than that for a natural stone.

The presence of the resin component permits easy and high-grade processing.

There is practically no limitation on the nozzle and the system thereof for the ejection of high-pressure water. Any of various ones may be adopted.

This surface processing achieves flattening or roughing of the surface by means of water jet, and an artificial stone have deepness and massiveness is thus available.

The presence of the resin component eliminates the risk of surface clouding, and as compared with the etching technique using chemicals, it is easier to dispose the waste liquid.

It is needless to mention that the surface may be treated with an organic solvent and the resin component may partially be removed by softening or melting.

The organic solvent in this case may be selected, depending upon the resin component used, and applicable ones include, for example, a halogenized hydrocarbon such as ethylene chloride, methylene chloride, and chloroform, a carboxylic acid such as acetic anhydride, ethyl acetate, and butyl acetate, and esterified compounds thereof, acetone, tetrahydrofran, DMF, and DMSO.

Surface irregularities can be formed by immersing the molded product into the organic solvent, or spraying or pouring the organic solvent, and removing softening or melting portion of the resin component from the surface.

Or, surface irregularities may be formed by scraping the lower-hardness portion of the resin component from the surface by means of a wire brush or cutting.

After roughing the surface and applying a surface processing with any of the various means described above, the coating layer of the fine particle component on the surface is partially broken, as described above, and this coating layer and the fine particles are exposed on the product surface as a sectional face. This permits achievement of a unique deepness and glossy and massive surface. This is caused by a unique reflection of light as already described above.

There is no particular limitation on the means for surface polishing: tools such as a grindstone, a grinding cloth or a grinding belt may be use, or grinding agents such as a buff grinding agent or a rubbing compound may be used for this purpose.

As the grinding agent, any of diamond, boron carbide, corundum, alumina and zirconia mainly used for polishing, tripoli, dolomite, alumina, chromium oxide and cerium mainly used for grinding and polishing may appropriately be selected for use.

After such polishing, the surface may of course be further roughened to form irregularities. In this case also, at least part of the fine particles and the coating layer thereof must be exposed in section.

By all these operations, there is manufactured a massive artificial stone excellent in surface condition.

Now, some examples of application of the present invention will be described below. The present invention is not limited by the following examples.

EXAMPLES

Example 1

Natural silica stone particles having a particles size of from 10 to 25 mesh provided each with a surface baking layer having a thickness of about 30 μm made at about 1,000° C. by the use of a white glaze were used as 50 wt. % of the total fine particle component, and the fine particle component and 230 mesh calcium carbonate were uniformly mixed, in a weight ratio of 2:1 so as to account for 90 wt. % of the total weight of the composition, together with 9 wt. % polymethylmethacryl resin and 1 wt. % setting agent into a mortar-like mixture.

This composition was injected into a mold to form a plate-shaped product having a thickness of about 15 mm.

Then, the surface was polished by means of a corundum polishing agent. As a result, the fine particle component having baked coating layers was partially exposed as a partial sectional face of the baked layer and the fine particle component.

The resultant artificial stone had a deep marble-like milk white color and gloss, free from bubble in side and on the surface, with a uniform composition.

In a test carried out in accordance with the Japanese Industrial Standards JIS K-7112, a specific gravity of 2.29 was shown. The product had a water absorption of 0.13%. The other properties were as shown in Table 1.

TABLE 1

| Item | Result | Test condition |
| --- | --- | --- |
| Bending strength | 31.30 kgf/cm | Based on JIS A5209 |
| Compression strength | 1400 kgf/cm$^2$ | Cross-head speed: 0.5 mm/min Load cell: 2 tons |
| Impact strength | 4.58 kgf · cm/cm$^2$ | Pendulum impact tester |
| Hardness | 1021 kgf/mm$^2$ | Vickers hardness based on JIS Z-2244 |
| Linear expansion coefficient | 0.65 (× 10$^{-5}$ K) | TMA (30 ~ 100° C.) |
| Wear resistance | 0.03 g | Sand dropping wear resistance test based on JIS A-1452 |

JIS: Japanese Industrial Standards

In a immersion test into a 3% aqueous hydrochloric acid solution for eight hours and into a 3% aqueous sodium hydroxide solution for eight hours, no abnormality was observed.

When using the resultant product as a wall plate for a building, a beautiful marble-like stone having deepness was obtained.

Example 2

The same conditions as in the Example 1 were employed except that a sum of the fine particle and microparticle components of 93%, a resin component of 6%, and a thickness of the surface baking layer of 20 μm were adopted.

As in the Example 1, a high-quality artificial stone was obtained. It had a compression strength of 1,385 kg/cm2, a hardness of 1,025 kgf/mm$_2$ and a marble-like deep and excellent surface.

Example 3

A 15% portion of the total amount of a fine particle component of natural silica stone was coated with a blue glaze in a thickness of 25 μm on the particle surface.

Using this fine particle component with a size within a range of from 10 to 50 mesh, a plate-shaped body was molded in the same manner as in the Example 1.

The resultant product was polished with an alumina-zirconia polishing agent.

A deep and beautiful blue-white surface was obtained.

The product had physical properties substantially the same as those in the Example 1, thus achieving a high-quality artificial stone as a building material.

Example 4

For 65% of the total amount of a fine particle component of natural silica stone having a size of from 10 to 50 mesh, a polymethylmethacryl resin mixed with a cobalt blue (Pig Blue 28) pigment was set as a coating having a thickness of about 50 μm.

Molding was conducted in the same manner as in the Example 3, and then the surface was polished. A deep and beautiful surface tinted with blue and milk white in mixture was obtained.

This artificial stone product had a specific gravity of 2.29, a bending strength of 30.55 kgf/cm$^2$, a compression strength of 1,305 kgf/cm$^2$ and a hardness of 950 kgf/mm$^2$.

Comparative Example 1

The same steps as in the Example 1 were followed except that a fine particle component of 5 to 20 mesh was used. The resultant molded product showed an insufficient strength and was observed to have a non-uniform structure.

Comparative Example 2

Samples with weight ratios of the fine particle component to the microparticle component of 0.2:1 and 6:1 were prepared under the same conditions as in the Example 1. None of these samples showed a uniform and dense structure, and had practically satisfactory strength properties.

Comparative Example 3

The conditions in the Example 3 were followed except that the resin component accounted for 20 wt. % relative the total. The sample showed not only a reduced hardness properties, but also a tendency of easily suffering flaws, A feeling of a natural stone was not available, and the nature as being a resin product was easily determined.

Comparative Example 4

The same steps as in the Example 4 were followed without providing a coating layer on the fine particle component, and a product was molded by blending a green pigment into the resin component. Green tone was excessive, and the surface feeling of a natural stone was lost.

Example 5

A fine particle component containing about 80% natural silica stone particles of 10 to 50 mesh with a surface coating of a thickness of about 30 μm provided by baking water glass containing red pigment (iron oxide), and a microparticle component comprising a mixture of 100 to 350 mesh calcium carbonate and aluminum hydroxide at a ratio of 50:50 were mixed at a weight ratio of 2:1, and an unsaturated polyester resin added with a red pigment was mixed therein to account for 90% of the total.

This mixture was injected into a mold and compression-molded under a surface pressure of 10 kgf/cm$^2$, and the surface was polished with a corundum polishing agent.

A red artificial stone product very excellent in color tone and deepness was obtained. It had satisfactory strength properties including a bending strength of 32.05 kgf/cm$^2$, a compression strength of 1,405 kgf/cm$^2$, and a hardness of 1,062 kgf/mm$^2$.

INDUSTRIAL APPLICABILITY

According to the present invention, as described above, there is provided a high-density artificial stone having a deep and glossy color tone and satisfactory properties, so far unavailable. The resulting product exhibits a uniform quality which is hard to obtain in a natural stone. In addition, manufacture of such an excellent product is possible without particularly expensive facilities.

Particularly, the artificial stone of the present invention is suitable for obtaining granite or marble-like products, and can be applied in the same manner as in a natural stone.

The product is applicable as a wall material, floor material and column material more widely than natural stones as a high-quality product.

What is claimed is:

1. An artificial stone composition comprising a mixed inorganic component which comprises an inorganic fine particle component and an inorganic microparticle component, wherein the sum of the inorganic fine particle component having a size of from 10 to 70 mesh and the inorganic microparticle component having a size under 100 mesh accounts for at least 85 wt. % of the composition, and a resin component accounting for under 15 wt. % of the composition, and wherein all or part of the inorganic fine particle component comprises a transparent fine particle component comprising individual particles or particle lumps, and at least 10% of the total amount of the individual particles or particle lumps of the fine particle component are coated with an inorganic or an organic hard layer, wherein the hard layer is formed from a member selected from the group consisting of water glass, a glaze for ceramics, an acrylic resin or an unsaturated polyester resin.

2. The artificial stone composition according to claim 1, wherein said coating on the particles or particle lumps of the fine particle component has a thickness within a range of from 5 to 50 μm.

3. The artificial stone composition according to claim 1, wherein the fine particle component coating hard layer is formed by baking the fine particle component with water glass or water glass added with a pigment, or a glaze for ceramics.

4. The artificial stone composition according to claim 1, wherein said composition has a surface coating hard layer comprising a resin added with a pigment.

5. The artificial stone composition according to claim 1, wherein the fine particle component and the microparticle component are blended at a weight ratio within a range of from 0.5:1 to 5:1.

6. The artificial stone composition according to claim 1, wherein the ratio of the resin component is within a range of from 3 to 10 wt. %.

7. An artificial stone comprising the composition according to claim 1.

8. An artificial stone comprising the composition according to claim 1 wherein the surface is polished.

9. A method for manufacturing an artificial stone comprising the composition according to claim 1, comprising the steps of injecting said composition in a mold to cause hardening, and then polishing the surface thereof.

10. A method for manufacturing an artificial stone comprising the composition according to claim 1, comprising the steps of injecting said composition into a mold, applying a pressure, heating the same to harden, and then polishing the surface thereof.

11. The manufacturing method according to claim 10, wherein the composition is heated and hardened under a pressure within a range of from 5 to 100 $kgf/cm^2$ at a temperature within a range of from 90 to 140° C.

12. The method for manufacturing an artificial stone according to claim 10, wherein a surface processing is applied prior to polishing.

13. The method for manufacturing an artificial stone according to claim 10, wherein a surface processing is applied prior to polishing.

14. The artificial stone composition according to claim 1, wherein the fine particle component comprises a member selected from the group consisting of silica, olivine, feldspar, pyroxene, mica, granite, metamorphic rock, ceramics, glass and metals.

15. The artificial stone composition according to claim 1, wherein the microparticle component is selected from the group consisting of calcium carbonate, water glass and aluminum oxide.

16. The artificial stone composition according to claim 15, wherein the microparticles are further blended with manganese dioxide, titanium dioxide, zirconium silicate, iron oxide, antimony trioxide, boron compounds or bromine compounds.

17. The artificial stone composition according to claim 1, wherein the resin component is polymethyl methacrylate resin.

18. The artificial stone composition according to claim 1, wherein the coating on the fine particle component is acrylic resin or an unsaturated polyester resin.

19. The artificial stone composition according to claim 4, wherein the coating on the fine particle component is acrylic resin or an unsaturated polyester resin.

20. The artificial stone composition of claim 1 having a density of at least 2.2 $g/cm^3$.

* * * * *